US007901655B2

(12) United States Patent
Mesters et al.

(10) Patent No.: US 7,901,655 B2
(45) Date of Patent: *Mar. 8, 2011

(54) PROCESS FOR PRODUCING A GAS STREAM DEPLETED OF HYDROGEN SULPHIDE

(75) Inventors: Carolus Matthias Anna Maria Mesters, Amsterdam (NL); Isaac Cornelis Van Den Born, Amsterdam (NL)

(73) Assignee: Shell Oil Company, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/770,561

(22) Filed: Apr. 29, 2010

(65) Prior Publication Data

US 2010/0209322 A1 Aug. 19, 2010

Related U.S. Application Data

(62) Division of application No. 11/887,292, filed as application No. PCT/EP2006/061073 on Mar. 28, 2006, now Pat. No. 7,727,507.

(30) Foreign Application Priority Data

Mar. 30, 2005 (EP) .................................. 05075740

(51) Int. Cl.
*C01B 17/04* (2006.01)
*C01B 17/50* (2006.01)

(52) U.S. Cl. ...... 423/539; 423/542; 423/543; 423/573.1; 423/576.8

(58) Field of Classification Search .................. 423/539, 423/542, 543, 573.1, 576.8
See application file for complete search history.

(56) References Cited

U.S. PATENT DOCUMENTS

| 3,485,581 | A | * | 12/1969 | Miller et al. | ................... 423/539 |
|---|---|---|---|---|---|
| 4,311,680 | A | | 1/1982 | Frech et al. | .................... 423/230 |
| 4,311,683 | A | | 1/1982 | Hass et al. | ..................... 423/573 |
| 4,324,776 | A | | 4/1982 | Kim | .............................. 423/550 |
| 4,487,753 | A | | 12/1984 | Massie et al. | ............. 423/573 R |
| 4,632,818 | A | | 12/1986 | Chen et al. | ................. 423/574 R |
| 4,640,908 | A | | 2/1987 | Dupin | ........................... 502/243 |
| 4,886,649 | A | | 12/1989 | Ismagilov et al. | ............ 423/230 |
| 6,083,473 | A | | 7/2000 | Esquivel et al. | ........... 423/576.8 |
| 6,207,127 | B1 | | 3/2001 | Geus et al. | ................. 423/573.1 |
| 6,235,259 | B1 | | 5/2001 | Ledoux et al. | ............. 423/573.1 |
| 6,372,193 | B1 | | 4/2002 | Ledoux et al. | ............. 423/573.1 |
| 6,403,051 | B1 | | 6/2002 | Keller | ........................ 423/573.1 |
| 7,727,507 | B2 | * | 6/2010 | Mesters et al. | ................ 423/539 |
| 2005/0100504 | A1 | | 5/2005 | Geus et al. | ................. 423/573.1 |

FOREIGN PATENT DOCUMENTS

| EP | 0242920 | 4/1987 |
|---|---|---|
| EP | 0229587 | 7/1987 |
| EP | 0409353 | 7/1990 |
| WO | WO8906675 | 7/1989 |
| WO | WO2005030638 | 4/2005 |

OTHER PUBLICATIONS

R. F. Bacon and R. Fanelli, J. Am. Chem. Soc. 65 (1943) (639).
Touro et al. J. Phys. Chem. 70 (1966) (239).

* cited by examiner

*Primary Examiner* — Timothy C Vanoy
(74) *Attorney, Agent, or Firm* — Charles W. Stewart

(57) ABSTRACT

A process for treating a gas stream comprising H2S that includes the step of selectively oxidizing the H2S of the gas stream within a catalytic zone containing an oxidation catalyst and in the presence of an inert liquid medium and molecular oxygen to form elemental sulfur and a gas stream depleted of $H_2S$. A liquid stream yielded from the catalytic zone and containing the inert liquid medium and liquid elemental sulfur undergoes a separation into a first liquid phase rich in the inert liquid medium and a second liquid phase rich in elemental sulfur. Either at least a part of the liquid stream or at least a part of the second liquid phase, or both, undergoes a combustion to form a fluid stream that comprises sulfur dioxide.

17 Claims, No Drawings

PROCESS FOR PRODUCING A GAS STREAM DEPLETED OF HYDROGEN SULPHIDE

This application is a divisional of U.S. application Ser. No. 11/887,292, filed Sep. 27, 2007 now U.S. Pat. No. 7,727,507, which was the National Stage application of International Application No. PCT/EP2006/061073, filed Mar. 28, 2006, which claims priority to European Application EP 05075740.0, filed Mar. 30, 2005.

The invention relates to a process for producing a gas stream depleted of hydrogen sulphide ($H_2S$).

A process known in the art for producing a gas stream depleted of $H_2S$ from a gas stream comprising $H_2S$ is the oxidation of $H_2S$ to $SO_2$ according to:

$$2H_2S + 3O_2 \rightarrow 2H_2O + 2SO_2 \qquad (1)$$

The $SO_2$ formed can be (catalytically) converted to elemental sulphur according to the Claus reaction:

$$2H_2S + SO_2 \rightarrow 2H_2O + 3/n S_n \qquad (2)$$

The combination of reactions (1) and (2) is known as the Claus process. The Claus process is frequently employed both in refineries and for the processing of $H_2S$ recovered from natural gas. A disadvantage of the Claus process is that it is thermodynamically limited by the increase of the water vapour content and simultaneously by the decrease of the $H_2S$ and $SO_2$ concentration as the $H_2S$ conversion proceeds, with the result that the equilibrium of the Claus reaction shifts to the left. Since the dew point of water lies below the solidification point of sulphur, condensation of the water vapour in the process gas to remove this limitation can lead to serious problems, such as clogging due to the solidification of sulphur and corrosion due to the formation of sulphuric acid, causing serious operational problems. Another disadvantage of the Claus process is that the concentration of $H_2S$ in the treated gas is still relatively high. The Claus process has been improved to an extent where the $H_2S$ content of the treated gas can be lowered to approximately 1 vol % (Superclaus-99 process). However, especially in the case where it is necessary to comply with requirements with regard to residential use or environmental regulations with respect to emission of sulphur compounds, even lower concentrations of $H_2S$, in the ppm range, have to be achieved.

A disadvantage of the Claus and Superclaus process is that such low concentrations of $H_2S$ cannot be achieved.

A further disadvantage is that $H_2S$ needs to be separated from the gas stream comprising $H_2S$ (which can for example be a natural gas stream) and the resulting stream enriched in $H_2S$ is then fed to a Claus unit. The reason for this is that the oxidation reaction according to reaction (1) will also cause oxidation of species other than $H_2S$. Additionally, the Claus process needs a feed enriched in $H_2S$ to proceed at an acceptable rate. One generally applied method to achieve separation of $H_2S$ is to contact the gas stream comprising $H_2S$ with an absorption solvent, typically one or more amine solvents, to form a solvent loaded with $H_2S$. The regeneration of this loaded solvent stream results in a gas stream enriched in $H_2S$, which can then subsequently be treated according to reactions (1) and (2) in the absence of hydrocarbons or hydrogen. Thus, a conventional process for producing a gas stream depleted of $H_2S$ comprises the steps of absorption of $H_2S$ in an amine absorption unit, followed by regeneration of the amine liquid to produce a gas stream loaded with $H_2S$ and finally conversion of $H_2S$ to sulphur in a Claus unit. This results in a cumbersome process and large amounts of amine solvents are needed.

Another known process for producing a gas stream depleted of $H_2S$ from a gas stream comprising $H_2S$ is the selective oxidation of $H_2S$ to elemental sulphur, described for example in U.S. Pat. No. 4,886,649. The selective oxidation in U.S. Pat. No. 4,886,649 is performed in two stages. The feed oxidation stage is carried out in a fluidised bed of a granular catalyst containing 10-20% by mass of magnesium chromate on aluminium oxide at temperatures between 250-350° C. In the second oxidation stage, unreacted $H_2S$ and oxygen from the feed stage are reacted at 140-155° C. in the presence of a catalyst containing vanadium pentoxide and aluminium oxide.

A disadvantage of the process of U.S. Pat. No. 4,886,649 is that gaseous sulphur is formed in the feed stage. At the concentrations wherein sulphur is present in the gaseous effluent of the feed stage, this will inevitably result in the formation of a sulphur mist, which is difficult to separate from the gas flow and results in deposition of elemental sulphur on the catalyst, reactor elements or conduits.

In U.S. Pat. No. 4,311,683 a process for producing a gas stream depleted of $H_2S$ is described wherein $H_2S$ is removed from a feed gas stream by selective oxidation of $H_2S$. The feed gas stream comprising $H_2S$ and oxygen is passed through a catalyst bed under conditions such that $H_2S$ and oxygen react to produce elemental sulphur vapour. An inlet temperature into the catalyst bed of between about 250° and 450° F. (121° and 232° C.) is mentioned. An oxidation catalyst comprising an oxide and/or sulphide of vanadium supported on a non-alkaline porous refractory oxide is used. It is mentioned that sulphur deposition and consequent catalyst deactivation are prevented by maintaining the partial pressure of free sulphur in the oxidation reactor below that necessary for condensation. Preferably, the temperature is maintained below 450° F. (232° C.) and the $H_2S$ concentration in the feed is kept low by diluting the feed with an inert gas or with recycle gases.

In U.S. Pat. No. 6,207,127 a selective oxidation process in an adiabatically operating reactor is described wherein the inlet temperature of the catalyst bed is at least 150° C., preferably at least 170° C., i.e. above the dew point of the sulphur formed. The catalyst comprises a mixed oxide of iron and zinc on a silica support.

In the processes described in U.S. Pat. No. 4,311,683 and U.S. Pat. No. 6,207,127, sulphur is kept in the vapour phase by performing the selective oxidation at temperatures above about 160° C. and by keeping the sulphur concentration very low. This means that these processes are not suitable for deep desulphurisation of gases having a high content of $H_2S$, since this would inevitably lead to sulphur deposition.

A further disadvantage of all the processes mentioned hereinbefore is that a considerable amount of sulphur is produced as waste.

Yet another disadvantage of all the processes mentioned hereinbefore is that they do not enable the removal of mercaptans, in the event that it is desired to produce a gas stream depleted of $H_2S$ as well as of mercaptans from a feed gas stream comprising mercaptans as well as $H_2S$. The removal of mercaptans from a gas stream is generally more difficult compared to the removal of $H_2S$. The removal of mercaptans is of importance in view of increasingly stringent environmental and technical requirements. Mercaptans, due to their odorous nature, can be detected at parts per million concentration levels. Thus, it is desirable in cases where the gas stream is intended for domestic use, to have concentrations of mercaptans lowered to e.g. less than 5, or even less than 2 ppmv.

Mercaptan removal is also important in cases where the gas stream is a carrier gas stream, for example an inert gas or a hydrocarbonaceous gas that has been used to strip a mercaptan comprising reactor bed and is loaded with mercaptans. The removal of mercaptans from such a loaded gas stream is necessary to be able to use the gas stream again as stripping gas.

Processes for the removal of mercaptans from a gas stream are generally based on physical absorption, solid bed adsorption and/or chemical reaction.

Physical absorption processes generally suffer from the fact that large reactors are needed to achieve the desired low concentrations of mercaptans.

Solid bed adsorption processes suffer from the fact that they are only able to adsorb limited amounts of undesired compounds, while regeneration is relatively cumbersome, see for example U.S. Pat. No. 4,311,680.

Chemical processes suffer from the fact that they do not effectively remove mercaptans, often have a high consumption of chemicals and often produce large amounts of waste, see for example EP 229,587.

In view of the difficulties encountered in the known processes, there is a need in the art for a process for producing a gas stream depleted of $H_2S$ from a gas stream comprising $H_2S$ in a relatively high amount without the operational problems of known processes and without the production of a considerable amount of waste sulphur. This is important because the sulphur market is not able to absorb increasing supplies of elemental sulphur, as can be observed by increasing storage of elemental sulphur (also denoted as "yellow mountains"). Further, it is desired to have a process for producing a gas stream depleted in $H_2S$ as well as mercaptans from a feed gas stream comprising $H_2S$ as well as mercaptans.

It has now been found that the above can be achieved by selectively catalytically oxidising $H_2S$ to elemental sulphur in the presence of an inert liquid medium such that the sulphur formed is essentially in liquid form and can be removed from the catalyst with the inert liquid medium, and combusting the elemental sulphur thus formed to $SO_2$.

Accordingly, the invention provides a process for producing a gas stream depleted of $H_2S$ from a feed gas stream comprising $H_2S$, the process comprising the steps of:

(a) selectively oxidizing $H_2S$ by supplying the feed gas stream comprising $H_2S$, an inert liquid medium and a molecular-oxygen comprising gas stream to a reaction zone comprising at least one catalytic zone comprising an oxidation catalyst and contacting the oxidation catalyst of each catalytic zone with the feed gas stream and/or the molecular-oxygen comprising gas stream in the presence of inert liquid medium at a temperature in the range of from 120 to 160° C. to form elemental sulphur and the gas stream depleted of $H_2S$, under such conditions that the elemental sulphur formed is essentially in liquid form and is removed from the reaction zone with inert liquid medium to obtain a liquid stream comprising inert liquid medium and essentially liquid elemental sulphur;

(b) optionally separating the liquid stream obtained in step (a) into a first liquid phase enriched in inert liquid medium and a second liquid phase enriched in liquid elemental sulphur;

(c) combusting at least part of the liquid stream obtained in step (a) or at least part of the second liquid phase obtained in step (b) to form a fluid stream comprising sulphur dioxide.

The process according to the invention offers a number of advantages.

A significant advantage is that the process according to the invention enables the production of a gas stream depleted of $H_2S$ in two steps, without producing substantial sulphur waste. The process according to the invention is considerably simplified in view of a conventional process wherein amine absorption is needed, followed by a Claus process. In the process according to the invention, no amine solvent is needed.

One advantage is that unwanted build-up of sulphur in the catalytic zone is prevented. By performing the catalytic selective oxidation in the presence of an inert liquid medium at a temperature in the range of from 120 to 160° C., the sulphur formed is essentially in liquid form and can be removed from the catalyst with the inert liquid medium as a liquid sulphur phase. This facilitates the conversion of $H_2S$ because no sulphur deposition on the catalyst surface will take place. This enables the production of a gas stream depleted of $H_2S$ having an $H_2S$ concentration in the ppmv range (a $H_2S$ conversion higher than 99.9% is possible).

Another advantage is that the oxidation of $H_2S$ to elemental sulphur is selective in the sense that compounds other than $H_2S$, such as hydrocarbons or hydrogen, are not or hardly oxidized.

Yet another advantage is that elemental sulphur is converted into sulphur dioxide, thereby considerably reducing the amount of liquid or solid waste.

A further advantage is that in the event that mercaptans are present in the feed gas stream, they will be removed from the catalytic zone as part of the liquid stream comprising inert liquid medium and essentially liquid elemental sulphur and will eventually be combusted to sulphur dioxide, carbon dioxide and water in step (c). Hence, the process according to the invention offers a relatively simple way to produce a gas stream depleted of $H_2S$ as well as mercaptans.

Finally, the heat released in the combustion step (c) can be used advantageously, for example to generate power and/or high-pressure steam to be used elsewhere.

DETAILED DESCRIPTION OF THE INVENTION

In step (a) of the process according to the invention, a feed gas stream comprising $H_2S$, a molecular oxygen-containing gas stream and inert liquid medium are supplied to a reaction zone comprising at least one catalytic zone comprising an oxidation catalyst.

The oxidation catalyst may be any oxidation catalyst suitable for the selective oxidation of $H_2S$. Suitable catalysts for the selective oxidation of $H_2S$ are generally in the form of a refractory oxide material on which a catalytically active material has been deposited. The oxidation catalyst may comprise as catalytically active material any material that is capable of performing an oxidation reaction. Such oxidation catalysts are known in the art and typically comprise an oxide and/or a sulphide compound of one or more metals. Reference herein to an oxide compound of one or more metals is to a compound of the approximate general formula $MS_{x-1}O_y$, wherein M is one or more metals, and x and y have, independently, a numeric value of at least 1. Reference herein to a sulphide compound of one or more metals is to a compound of the approximate general formula $MS_xO_{y-1}$. When contacted with $H_2S$, the metal oxide compound will be converted to a metal sulphide compound and water is formed. When the thus-formed metal sulphide compound is then contacted with oxygen, it is converted into the metal oxide compound and elemental sulphur is formed. These two subsequent reactions are symbolically represented by the following equations:

$$MS_{x-1}O_y + H_2S \rightarrow MS_xO_{y-1} + H_2O \tag{3a}$$

$$MS_xO_{y-1} + \tfrac{1}{2}O_2 \rightarrow MS_{x-1}O_y + S \tag{3b}$$

The overall reaction is the selective oxidation reaction according to equation (3).

$$2H_2S + O_2 \rightarrow 2H_2O + 2/nS_n \quad (3)$$

It will be appreciated that the proportion of oxygen and sulphur in the catalyst metal compound will vary during the catalytic process. The compound having the highest proportion of oxygen is represented as $MS_xO_{y-1}$ in equations (3a) and (3b) and referred to as oxide. The compound having the highest proportion of sulphur is represented as $MS_{x-1}O_y$ and referred to as sulphide.

The metal M may for example be vanadium, chromium, manganese, iron, cobalt, molybdenum or combinations thereof. Examples of prior art catalysts for the selective oxidation of $H_2S$ are iron oxide-chromium oxide on silica, iron oxide-phosphorus oxide on silica, iron oxide-sodium oxide on silica (EP-A-0409353) magnesium chromite on alumina, vanadium pentoxide on alumina (U.S. Pat. No. 4,886,649) and silicon carbide supporting an active phase comprising nickel in the oxysulfide form (U.S. Pat. No. 6,235,259). Preferably, the catalytically active material is an oxide and/or sulphide compound of iron or an iron comprising mixed metal oxide and/or sulphide compound, more preferably the catalytically active material comprises a hydrated iron oxide compound.

The reaction zone in step (a) comprises at least one catalytic zone. In some embodiments of step (a) of the process according to the invention, both reactions (3a) and (3b) take place in each catalytic zone. In these embodiments, the feed gas stream comprising $H_2S$ and the molecular oxygen gas stream are both supplied to each catalytic zone. In each catalytic zone, the catalytically active compounds of the oxidation catalyst, i.e. the oxide or sulphide compounds of a metal, will alternately be in its oxide ($MS_{x-1}O_y$) and sulphide ($MS_xO_{y-1}$) form.

In alternative embodiments of step (a), reaction (3a) takes place in one catalytic zone and reaction (3b) takes place in a different catalytic zone. The feed gas stream comprising $H_2S$ is then supplied to the catalytic zone where reaction (3a) takes place and the molecular-oxygen containing gas stream is then supplied to the catalytic zone where reaction (3b) takes place. During the process, the oxidation catalyst in the catalytic zone wherein reaction (3a) takes place will be converted from its oxide form ($MS_{x-1}O_y$) into its sulphide form ($MS_xO_{y-1}$) and the oxidation catalyst in the catalytic zone wherein reaction (3b) takes place will be converted from its sulphide form into its oxide form. It will be appreciated that in these alternative embodiments, the oxidation catalyst can be considered as a regenerable adsorbent.

In all embodiments of step (a), the inert liquid medium is preferably recycled at least partly to the catalytic zone. In case that the inert liquid medium is not liquid sulphur, at least part of the sulphur is preferably removed from the inert liquid medium before recycling it. In that case, the greater part of the sulphur may be separated from the liquid stream by phase separation.

In a first embodiment of step (a) of the process according to the invention, the reaction zone comprises a single catalytic zone of oxidation catalyst and the feed gas stream comprising $H_2S$, the molecular-oxygen comprising gas and the liquid inert medium are supplied to that single catalytic zone. In this first embodiment of step (a), the feed gas stream comprising $H_2S$ and the stream comprising oxygen are contacted with the oxidation catalyst in the presence of inert liquid medium. The temperature of the single catalytic zone is maintained in the range of from 120 to 160° C. The heat released by the exothermic oxidation reaction is at least partly absorbed by the inert liquid medium. Due to the heat absorption by the inert liquid medium and, optionally, by additional internal or external cooling means, the temperature in the single catalytic zone is kept below the temperature at which a significant viscosity increase due to sulphur polymerization takes place, i.e. below about 160° C.

A gas-liquid mixture comprising a gas stream depleted in $H_2S$ and inert liquid medium with the sulphur formed dissolved in it, mixed with it or finely dispersed or emulsified in it, is removed from the catalytic zone. The gas and liquid are separated into a gas stream depleted in $H_2S$ and a liquid stream comprising inert liquid medium and essentially liquid elemental sulphur. The liquid stream may comprise more than one liquid phase, for example a phase of inert liquid and a separate phase of liquid sulphur and/or water.

In a second embodiment of step (a), the reaction zone of the process according to the invention comprises two or more catalytic zones of oxidation catalyst in series. Both reactions (3a) and (3b) then take place in each catalytic zone. The feed gas stream comprising $H_2S$ and the oxygen gas stream are supplied to and contacted with the oxidation catalyst of each catalytic zone.

The use of several catalytic zones in series is advantageous in the case of a feed gas stream having a high content of $H_2S$, typically up to 50 vol %, based on the total feed gas stream. In that case, several catalytic zones in series can provide for the possibilities of interstage cooling, interstage water separation, staged supply of feed gas or of molecular-oxygen containing gas or a combination of two or more thereof.

In the case of several catalytic zones in series, at least part of the feed gas stream comprising $H_2S$, at least part of the oxygen comprising gas stream and at least part of the inert liquid medium are supplied to the first, i.e. the most upstream, catalytic zone, which is operated as hereinbefore described for the first embodiment.

Preferably, the effluent of the first catalytic zone, i.e. a gas-liquid mixture comprising a gas stream depleted of $H_2S$ and inert liquid medium with the sulphur formed dissolved in it, mixed with it or finely dispersed or emulsified in it, is sent to the second catalytic zone, optionally after cooling. The remainder of the feed gas stream and/or molecular-oxygen containing gas stream is then supplied to the second catalytic zone. It will be appreciated that if there are more than two catalytic zones, the remainder of the feed gas and/or molecular-oxygen containing gas may be divided over the second and further downstream catalytic zones. The effluent of the catalytic zone which is located most downstream will be separated into a $H_2S$ depleted gas stream and a liquid phase comprising inert liquid medium and sulphur. Preferably, inert liquid medium is recycled back to the first catalytic zone, typically after removal of at least part of the elemental sulphur.

It is possible to separate the effluent from each catalytic zone into gas and liquid and to recycle inert liquid medium to that catalytic zone. In that case, new inert liquid medium has to be supplied to the next downstream catalytic zone.

The process according to the present invention is very suitable for purifying a feed gas stream having a relatively high content of $H_2S$, i.e. up to 50 vol %, based on the total feed gas stream. Preferably, the $H_2S$ concentration in the feed gas stream comprising $H_2S$ is in the range of from 0.5 to 50 vol %, more preferably of from 1 to 25 vol %, based on the total feed gas stream.

In the case of a relatively high $H_2S$ concentration of the feed gas, typically in the range of from 5 to 25 vol %, it is advantageous to apply inter-stage water separation by separating an inter-stage effluent into its gaseous and liquid part and condense water from the gaseous part before it is supplied to the next downstream catalytic zone. Inter-stage water separation is preferably applied in combination with staged supply of the molecular-oxygen comprising gas stream and/or feed gas stream. In the case of a very high $H_2S$ concentration sulphide of the feed gas, typically in the range of from 10 to 50 vol %, based on the total feed gas stream, it is advantageous to perform the process in such way that reactions (3a) and (3b) are carried out in separate catalytic zones. This enables the use of air as molecular-oxygen comprising gas, without causing the $H_2S$ depleted gas stream to be diluted with nitrogen gas from the air.

If the reactions (3a) and (3b) are carried out in separate catalytic zones, the reaction zone comprises catalytic zone A and catalytic zone B, both zones comprising an oxidation catalyst comprising an oxide and/or sulphide compound of one or more metals. The oxidation catalyst in zone A comprises the oxide compound and the oxidation catalyst of zone B comprises the sulphide compound of the metal(s). The feed gas stream comprising $H_2S$ and the inert liquid medium are supplied to catalytic zone A and contacted with the oxidation catalyst of zone A to convert the metal oxide compound into its sulphide and to form a gas stream depleted in $H_2S$. Air and inert liquid medium are supplied to catalytic zone B and contacted with the oxidation catalyst of zone B to convert the metal sulphide compound into its oxide and to form elemental sulphur.

A gas stream depleted in $H_2S$ and a liquid stream comprising inert liquid medium are separately recovered from zone A. Inert liquid medium recovered from zone A is preferably recycled to zone A or supplied to zone B or both. From zone B, a gaseous stream of depleted air and a liquid stream comprising inert liquid medium and essentially liquid elemental sulphur are separately recovered. The inert liquid medium recovered from zone B is preferably recycled to zone B or supplied to zone A, typically after removal of at least part of the sulphur.

Preferably, the oxidation catalyst used in zone A is, when the metal oxide compound is for a substantial part converted into its sulphide, used as the oxidation catalyst in zone B and vice versa, i.e. the oxidation catalyst used in zone B is, when the metal sulphide compound is for a substantial part converted into its oxide, used as the oxidation catalyst in zone A. In the case that the catalytic zones each comprise a fixed bed of oxidation catalyst, this is typically done in a so-called swing mode operation. In the case that the catalytic zones each are in the form of a slurry-bubble column comprising a slurry of particles of the oxidation catalyst in inert liquid medium, this may be done by removing slurry from zone B and, optionally after removal of sulphur, supplying it to zone A and vice versa. The slurry removed from zone B comprises catalyst particles comprising a metal oxide compound, inert liquid medium, and liquid sulphur. In order to prevent build-up of sulphur, preferably at least part of the sulphur is removed from the slurry before it is supplied to zone A. The slurry removed from zone A comprises catalyst particles comprising a metal sulphide compound and inert liquid medium.

The feed gas stream comprising $H_2S$ is preferably supplied to one or more of the catalytic zones in the reaction zone at a gas hourly velocity in the range of from 100 to 10,000 Nl/kg/h (normal liters of gas per kilogram of catalyst in that zone per hour), more preferably of from 200 to 5,000 Nl/kg/h. Reference herein to normal liters is to liters of gas at conditions of Standard Temperature and Pressure, i.e. 0° C. and 1 atmosphere.

The amount of inert liquid medium supplied to a catalytic zone is preferably such that the ratio of gas-to-liquid supplied to that zone is in the range of from 10 to 10,000 Nl gas/kg liquid, more preferably of from 20 to 2,000 Nl gas/kg liquid. It will be appreciated that the exact gas-to-liquid ratio mainly depends on the amount of $H_2S$ that is to be oxidized in that catalytic zone, since the inert liquid serves to absorb the reaction heat in order to keep the reaction temperature of that zone below the temperature at which a significant viscosity increase due to sulphur polymerisation takes place, i.e. below 160° C.

In those embodiments wherein reactions (3a) and (3b) take place in separate catalytic zones, the catalytic zone wherein reaction (3a) takes place, i.e. catalytic zone A, is also supplied with inert liquid medium in order to absorb the heat of exothermic reaction (3a). In the preferred embodiment wherein the inert liquid medium is sulphur, the inert liquid medium has in zone A the additional function of keeping the sulphur in the liquid form and to remove it from zone A.

If the feed gas stream has a very high $H_2S$ content, typically above 10%, it might be preferred to apply additional cooling of the reaction zone, i.e. additional to the cooling effected by the supply of inert liquid medium. Additional cooling may for example be achieved by using a catalytic zone in the form of a multitubular reactor with a fixed bed of oxidation catalyst particles inside the tubes or on the shell side of the tubes and supplying coolant to the other side of the tubes. In a slurry bubble column, additional cooling may be achieved by providing the bubble column with cooling coils.

The feed gas stream comprising $H_2S$ and the inert liquid medium will typically be supplied separately to the reaction zone. Alternatively, the feed gas stream comprising $H_2S$ may be contacted with the inert liquid medium before they are supplied together to the reaction zone. In that case, part or all of the $H_2S$ may be dissolved in the inert liquid medium that is supplied to the reaction zone.

Each catalytic zone in the reaction zone of the process according to the invention may be in any form that is suitable for a three-phase reaction system, for example a trickle flow fixed catalyst bed or a slurry bubble column.

Reference herein to a $H_2S$-depleted gas stream is to a gas stream wherein the $H_2S$ concentration is lower than the $H_2S$ concentration in the feed gas stream comprising $H_2S$. It will be understood that the $H_2S$ concentration in the $H_2S$-depleted gas will depend on the $H_2S$ concentration in the feed gas stream and on the conversion of $H_2S$. Preferably, the $H_2S$ conversion in step (a) is at least 40%, typically in the range of from 40 to 99.99%. Typical ranges of $H_2S$ concentration in the $H_2S$ depleted stream are from 0.001 ppmv to 1 vol %, based on the total gas stream. Preferably, the $H_2S$ concentration in the $H_2S$ depleted stream is less than 1 ppmv.

The overall molar ratio of oxygen in the molecular-oxygen comprising gas and $H_2S$ in the feed gas that are supplied to the reaction zone is preferably in the range of from 0.3 to 3.0, more preferably of from 0.5 to 2.0. In order to achieve deep desulphurisation, i.e. to obtain a $H_2S$ depleted gas having less than 1 ppmv of $H_2S$, the overall molar ratio is suitably at least slightly above the stoichiometric ratio of 0.5. Thus, an oxygen-to-$H_2S$ ratio in the range of from 0.6 to 1.5 is particularly preferred.

The oxygen concentration in the molecular-oxygen comprising gas is not critical. It will be appreciated that the preferred oxygen concentration depends primarily on the concentration of the $H_2S$ in the $H_2S$ comprising gas. In the case of a very high content of $H_2S$ in the feed gas it is preferred, in order to avoid a high concentration of nitrogen or other gases in the $H_2S$ depleted gas, to either use substantially pure oxygen or to use air in an embodiment of the process wherein reactions (3a) and (3b) are performed in separate catalytic zones. Examples of suitable molecular-oxygen comprising gases are oxygen, air or oxygen-enriched air.

In the process according to the invention, the temperature in each catalytic zone is in the range of from 120 to 160° C., preferably of from 125 to 150° C.

The present invention can be used to selectively oxidize $H_2S$ in step (a) from various gaseous streams, for example light hydrocarbons, such as methane, ethane, propane, and gases derived from such light hydrocarbons; natural gas; gases derived from tar sand and shale oils; gases associated with crude oil production; coal derived synthesis gas; gases such as hydrogen, nitrogen, carbon monoxide, carbon dioxide and mixtures thereof; steam; inert gases such as helium and argon; and product gas streams from other $H_2S$ removal processes that contain residual $H_2S$.

The reaction zone in step (a) of the process according to the invention is preferably operated at elevated pressure, more preferably a pressure in the range of from 2 to 200 bara, even more preferably in the range of from 10 to 150 bara. Most preferably, the operating pressure is in the range of from 60 to 120 bara. In those embodiments wherein reactions (3a) and (3b) are performed in separate catalytic zones, it might be advantageous to operate catalytic zone B (reaction (3b)) at a lower pressure than catalytic zone A (reaction (3a)).

It is an advantage of the process of the invention that the feed gas stream comprising $H_2S$ can be oxidised at the pressure at which it is produced or at which it becomes available. If the feed gas stream is for example natural gas, it can be processed in step (a) at the pressure at which it is produced at the well and effluents from a hydroprocessing or gasification unit can be processed without depressurizing them.

In all embodiments, the sulphur formed in step (a) of the process according to the invention is essentially in liquid form. Essentially in liquid form means that the degree of sulphur polymerization is limited to the extent that the sulphur can still be removed from the reaction zone with the inert liquid medium, such that there is no build-up of sulphur on the catalyst to the extent that sulphur prohibits access of the reactants to the catalytically active sites. Therefore, the temperature in the at least one catalytic zone is at most 160° C.

The elemental sulphur formed in step (a) is removed from the reaction zone with inert liquid medium to obtain a liquid stream comprising inert liquid medium and essentially liquid elemental sulphur.

In all embodiments of the invention, the inert liquid medium is supplied to each catalytic zone and thus in each catalytic zone, the reactions according to equations (3a) and/or (3b) always take place in the presence of inert liquid medium. The inert liquid medium may be any liquid medium that is not substantially consumed under the process conditions and that does not substantially degrade the oxidation catalyst. At least part of the inert liquid medium should be in liquid form at the process conditions in order to be able to control the process temperature and to remove the sulphur formed from the reaction zone. The inert liquid medium may be a reaction product of the selective oxidation reaction (3), i.e. water or liquid sulphur. The inert liquid medium may also be another liquid compound that is not substantially consumed under the process conditions. Examples of such liquids are paraffins like n-pentane, n-hexane, n-heptane, n-octane and mixtures thereof, refinery hydrocarbon streams such as naphtha or kerosine, crude oil, toluene, alkanol amines and sulfinol. The inert liquid medium is preferably elemental sulphur. Liquid sulphur is a particular suitable inert liquid medium, because it avoids the need for separation of sulphur from the inert liquid medium and the inevitable separation losses. Thus, in the event that liquid sulphur is used as inert liquid medium step (b) is omitted.

In the event that the inert liquid medium is not liquid sulphur, it is preferred to separate the liquid stream obtained in step (a) into a first liquid phase enriched in inert liquid medium and a second liquid phase enriched in liquid elemental sulphur according to step (b). The separation may be achieved using any suitable separation technique, for example using a solid/liquid separator or using a density separator. Preferably, the separation is done without decompressing the liquid stream obtained in step (a). Preferably, the second liquid phase obtained in step (b) comprises elemental sulphur in the range of from 40 wt % to 100 wt %, more preferably of from 50 wt % to 100 wt %, based on the total weight of the second liquid phase.

In step (c) of the process according to the invention, at least part of the liquid stream obtained in step (a) or at least part of the second liquid phase obtained in step (b) is subjected to a combustion step, thereby forming a fluid stream comprising sulphur dioxide. At least part of the liquid stream obtained in step (a) or at least part of the second liquid phase obtained in step (b) is introduced into a combustion zone, typically by using compressed air. In the combustion zone, sulphur is burned to $SO_2$ according to reaction (4):

$$S + O_2 \rightarrow SO_2 + \text{heat} \quad (4)$$

An unwanted side reaction is the formation of $SO_3$ according to reaction (5):

$$SO_2 + \tfrac{1}{2}O_2 \rightarrow SO_3 + \text{heat} \quad (5)$$

When $SO_3$ reacts with water it will form sulphuric acid which can result in downstream corrosion problems. To avoid or suppress the undesired formation of $SO_3$, the $SO_2$ concentration and the combustion temperature in the combustion zone are kept at a high level. Preferably, the $SO_2$ concentration in the combustion zone is at least 5 vol %, more preferably at least 15 vol %. When using air in the combustion process, the maximum theoretical $SO_2$ concentration in the combustion chamber is 21 vol %. It has been found that an $SO_2$ concentration of 18 vol % gives an $SO_3$ concentration as low as 0.1%. Typically, the combustion temperature is in the range of from 800 to 1500° C., preferably from 1000 to 1300° C. This ensures that the formation of $SO_3$ is suppressed.

An advantage of the process according to the invention is that the amount of elemental sulphur, which would normally be discarded as waste, is considerably reduced.

Another advantage is that the heat released in the combustion process can be recovered. Typically, heat recovery is effected by passing the second gas stream comprising hot $SO_2$ gas from the combustion zone through a waste heat boiler, generating steam. The hot steam can then be used for example to generate power that can be used elsewhere in the process or outside the process.

Yet another, even more important advantage is that the process according to the invention enables the removal of mercaptans in the event that the feed gas stream comprises mercaptans, to produce a gas stream depleted of $H_2S$ as well as of mercaptans. Generally, mercaptans are more difficult to remove from the gas stream than $H_2S$, especially when it is desired to remove mercaptans to low levels. This problem is solved by the process according to the invention, as it allows the removal of mercaptans to low levels, in the ppm range and for some mercaptans even in the ppb range. Mercaptans will not be selectively oxidised in step (a), but they will be removed from the reaction zone together with the liquid stream comprising inert liquid medium and essentially liquid elemental sulphur obtained in step (a). Without wishing to be bound by any specific theory on mercaptan removal, it is believed that mercaptans are absorbed into the essentially liquid sulphur obtained in step (a) and/or are converted to polysulphides. In step (c), mercaptans and/or polysulphides will then be combusted to form carbon dioxide, water and $SO_x$. Thus, the process according to the invention enables the production of a gas stream depleted of $H_2S$ and depleted of mercaptans, because the mercaptans will to a large extent be dissolved in the liquid elemental sulphur and will thus be removed from the feed gas stream, resulting in a gas stream obtained in step (a) depleted of $H_2S$ as well as of mercaptans.

Reference herein to mercaptans is to aliphatic mercaptans, especially $C_1$-$C_6$ mercaptans, more especially $C_1$-$C_4$ mercaptans, aromatic mercaptans, especially phenyl mercaptan, or mixtures of aliphatic and aromatic mercaptans. The invention especially relates to the removal of methyl mercaptan, ethyl mercaptan, normal- and iso-propyl mercaptan and butyl mercaptan isomers.

The process according to the invention is suitable for feed gas streams comprising $H_2S$ and mercaptans, wherein the concentration of mercaptans is in the range of from 1 ppmv to 1 vol %, based on the total feed gas stream. It will be understood that the mercaptan concentration in the resulting $H_2S$-depleted gas stream gas stream obtained after step (a) will depend on the mercaptan concentration in the feed gas stream. Typical mercaptan concentrations in the $H_2S$-depleted gas stream gas stream obtained after step (a) will be in the range of from 100 ppbv to 0.1 vol %.

Preferably, the process comprises additional step (d) of injecting the fluid stream comprising sulphur dioxide obtained in step (c) into an acid gas field. This offers the advantage that no $SO_2$ is emitted to the atmosphere. The injection of $SO_2$ requires a high pressure. The pressure needed depends on several factors, inter alia on the composition of the acid gas field and on the depth of injection aimed for. Generally, the pressure needed is in the range of from 5 bara to 300 bara (bar absolute). An advantage of the process according to the invention is that, because step (a) is done at elevated pressures, the liquid stream comprising inert liquid medium and essentially liquid elemental sulphur obtained in step (a) is pressurised. This will result in a pressurised fluid stream comprising $SO_2$. No compression equipment or only small compression equipment will therefore be needed for the injection of $SO_2$ fluid stream into the acid gas field. Typically, the pressure of the liquid stream comprising inert liquid medium and essentially liquid sulphur obtained in step (a) is in the range of the operating pressure of the oxidation zone in step (a), typically from 2 to 200 bara, even more preferably in the range of from 10 to 150 bara, most preferably from 60 to 120 bara. The second gas stream comprising $SO_2$ will typically have a pressure slightly below the pressure of the liquid stream comprising inert liquid medium and essentially liquid sulphur obtained in step (a), typically 1 to 5 bara lower.

Preferably, $SO_2$ is injected into the acid gas field in the form of a solution. Solvent is then added to the fluid stream comprising sulphur dioxide obtained in step (c) to form a fluid stream comprising sulphur dioxide and the solvent. This fluid stream is then injected into the acid gas field.

The solvent can be water or an organic solvent. Suitable organic solvents are the lower alcohols such as methanol, ethanol and propanol, acetone or hydrocarbons.

$SO_2$, when injected into the acid gas field can react with $H_2S$ present in the acid gas field to form sulphur according to reaction (6):

If the $H_2S$ in the acid gas field is relatively concentrated, typically in amounts greater than 3 to 5%, in the gas phase and water is employed as solvent, the reaction occurs at a relatively rapid rate. If an organic solvent is used and conditions are otherwise the same, the reaction is generally somewhat slower. In this way, the reaction can be steered, for example to form a layer of sulphur in the acid gas field at a location a substantial distance away from the point of injection. This layer of sulphur can be used as a barrier or plug in the acid gas field, to seal off part of the acid gas field. Misdirected placement of a sulphur layer around the point of injection may be avoided by injecting a solvent, for example alcohol, which is miscible in the acid gas field, optionally followed by injection of a suitable hydrocarbon. This will reduce water saturation near the point of injection and will furthermore drive away $H_2S$ from the point of injection, thereby preventing the formation of sulphur near the point of injection. It will be understood that the exact procedure to be used depends inter alia upon the intended use of the resulting sulphur layer, the characteristics of the acid gas field and the size of the acid gas field.

Examples for Step (a)

Step (a) of the invention will now be illustrated by the following non-limiting examples 2 to 4.

Example 1

Comparative

Catalyst Preparation

Silica extrudates having a surface area of 358 m²/g as measured by nitrogen adsorption (according to the BET method) and a pore volume of 1.34 ml/g as measured by mercury intrusion were provided with hydrated iron oxide. 100 grams of the silica extrudates were impregnated with 134 ml of a solution prepared from 28.6 grams of ammonium iron citrate (containing 17.5 wt % iron) and de-ionized water. The impregnated material was rotated for 90 minutes to allow equilibration. The material was subsequently dried at 60° C. for 2 hours, followed by drying at 120° C. for 2 hours and calcinations in air at 500° C. for 1 hour. The initial colour of the catalyst was black, but turned into rusty brown due to hydration of iron oxide. The resulting catalyst had a surface area of 328 m²/g, a pore volume of 1.1 ml/g and an iron content of 4.7 wt % based on the total catalyst weight.

Selective Oxidation 3 grams of the catalyst prepared as described above were diluted with 0.1 mm silicon carbide particles to achieve a volume ratio of silicon carbide/catalyst particles of 1.67. This mixture was loaded into a reactor tube with an internal diameter of 10 mm, fitted with a 4 mm internal thermowell. The loaded reactor tube was mounted into a reaction system comprising an oven to preheat the feed and control the catalyst temperature. The reaction system furthermore comprised mass flow controllers (MFC) for dosing the various gases, a liquid supply system, a high-pressure gas-liquid separation vessel, a liquid level controller in combination with a valve to release the liquid effluent, a constant gas pressure valve and a wet gas meter.

At the start of the experiment, the reactor was pressurized with a flow of nitrogen to the reaction pressure of 30 bar g and the temperature was set at 135° C. The nitrogen flow was stopped and a feed gas comprising 15 vol % $H_2S$ in methane and a gas comprising 4 vol % of molecular oxygen in helium were supplied to the reactor at flow rates of 3.1 and 5.9 Nl/h,

(6)

respectively. Within 24 hours after start of the feed gas supply, the reactor was plugged as was evident from the absence of any gas flow. Unloading the reactor at room temperature revealed that solidified sulphur was formed, which had caused clogging of the catalyst.

Example 2

According to the Invention

A reactor tube was loaded with catalyst and mounted in a reactor system as described in Example 1. The reactor was pressurized to a pressure of 30 bar g using a nitrogen flow. Toluene was then supplied to the reactor tube continuously at a rate of 30 grams/hour and the temperature of the tube was set at 135° C. The nitrogen flow was stopped and a feed gas comprising 15 vol % $H_2S$ in methane and a gas comprising 4 vol % of molecular oxygen in helium were mixed with the toluene stream to be supplied to the reactor tube at flow rates of 3.1 and 5.9 Nl/h, respectively, upstream of the oven.

After 48 hours at 30 bar g, the pressure was decreased to 15 bar g.

After 72 hours at 15 bar g, the pressure was increased to 90 bar g and a feed gas comprising 7 vol % $H_2S$ in methane and a gas comprising 4 vol % of molecular oxygen in helium were mixed with the toluene stream to be supplied to the reactor tube at flow rates of 4.8 and 4.2 Nl/h, respectively.

After 48 hours on stream under these process conditions, pressure was decreased to 30 bar g and a feed gas comprising 15 vol % $H_2S$ in hydrogen and a gas comprising 4 vol % of molecular oxygen in helium were mixed with the toluene stream to be supplied to the reactor tube at flow rates of 3.1 and 5.9 Nl/h, respectively. These conditions were maintained during 72 hours.

During the whole experiment, gaseous and liquid effluent were continuously removed from the reactor tube.

Samples of the gaseous effluent were taken before each change in pressure or feed gas composition and at the end of the experiment. The samples were analyzed using online gas chromatography and X-ray fluorescence (XRF). The $H_2S$ and the methane conversion were calculated. The results are shown in Table 1.

The experiment clearly demonstrates that high $H_2S$ conversions are achieved with the $H_2S$ comprising methane feed gases at a temperature as low as 135° C. and that the catalyst does not deactivate over time. Furthermore it is demonstrated that oxygen reacts very selectively with the $H_2S$ in that the conversion of $CH_4$ is very low.

Example 3

According to the Invention

Catalyst Preparation

A precipitated iron oxide on silica powder, denoted as ABS 50 with a nominal composition of 50% wt $Fe_2O_3$ and 50% wt $SiO_2$, a particle size D[v,50] of 10 micron and a BET surface area of 270 m²/g, was obtained from Euro Support B.V. (Amersfoort, NL). The powder was treated in air at 450° C. for 2 hours, cooled down to room temperature. The resulting powder is used as catalyst A.

Selective Oxidation

A 250 ml autoclave reactor equipped with a magnetically coupled stirrer, a gas manifold to supply metered amounts of a gas via two separate dip tubes, a back-pressure regulator, a wet gas test meter and an on-line gas chromatograph was used for the selective oxidation experiment. The autoclave was filled with 306 grams of solid sulphur and 20.3 grams of catalyst A. The autoclave was heated to 135° C. After 2 hours, the stirrer was started at 800 rpm. The vessel was pressurized to 40 bar g using a gaseous stream of 7 vol % $H_2S$ in methane which was fed via the dip tube below the liquid level. When the pressure level was reached, the feed gas flow (7 vol % $H_2S$ in methane) was adjusted to 4.2 Nl/h and a gaseous stream of 4 vol % $O_2$ in helium was added via a separate dip tube, also below the level of the liquid, at a rate of 6.0 Nl/h. The $O_2/H_2S$ ratio of the gases supplied to the autoclave was calculated as 0.82 mole/mole and the gas hourly velocity as 510 Nl/kg catalyst/h.

After 30 hours, the feed gas flow is increased to 6.0 Nl/h, which corresponds to an $O_2/H_2S$ ratio of 0.57.

After another 20 hours, the feed gas flow was decreased to 3.5 Nl/h corresponding to a gas hourly velocity of 475 Nl/kg/h and a $O_2/H_2S$ ratio of 0.98. After 72 hours, the experiment was stopped.

Samples of the gaseous effluent were taken before each change in feed gas flow and at the end of the experiment. The samples were analyzed using online gas chromatography (equipped with a pulsed discharge detector). The $H_2S$ and the methane conversion were calculated. The results are shown in Table 1. The $CO_2$ concentration in the effluent samples was less than 50 ppmv, indicating that oxidation of methane is virtually zero.

Example 4

According to the Invention

Catalyst Preparation 273.6 grams of the ABS 50 powder (see EXAMPLE 3) was mixed with 64.1 grams of de-ionized water, 60 grams of a 5% wt aqueous solution of poly vinyl alcohol and 16 grams of ammonia (25%) to an extrudable dough with a solids content of 53.2 wt % and a pH of 9.5. This mix was extruded using a 1.6 mm diameter trilobe die-plate. The extrudates were dried at 120° C. and calcined at 550° C. for 2 hours and used as catalyst B.

Selective Oxidation

A reactor system was used for the selective oxidation experiment, the system comprising:
a reactor tube;
a gas manifold to supply metered amounts of gases via two separate feed lines to the reactor tube;
a gas-liquid separator directly downstream of the reactor tube
a liquid recycle pump for recycling liquid from the gas-liquid separator to the reactor tube;
a liquid holding vessel that is connected to the liquid recycle system, from which liquid can be supplied to the reactor tube and to which liquid from the gas-liquid separator can be supplied; and
a back-pressure controller in the vapour effluent line from the gas-liquid separator. The entire reactor system was mounted into an oven for temperature control.

2.0 grams of catalyst B were diluted with an equal volume of SiC and loaded into the reactor tube, which was subsequently mounted into the reactor system. Solid sulphur (70 grams) was added to the liquid holding vessel. The temperature of the reactor system was set at 135° C. After melting, the liquid sulphur was added to the bottom part of the gas-liquid separator and the reactor system was pressurized with a stream comprising 4 vol % $O_2$ in helium to 60 bar g. Then, the liquid sulphur was recycled over the catalyst bed and the sulphur flow was monitored by differential pressure measurement using a capillary calibrated with oil at ambient pressure before the experiment. Feed gas (7 vol % $H_2S$ in methane) and a gas comprising 4 vol % $O_2$ in helium were supplied to the reactor tube at flow rates of 1.60 Nl/h and 1.63 Nl/h, respectively. This corresponds to a total gas hourly velocity of 1610 Nl/kg/h and an oxygen/$H_2S$ ratio of 0.56.

After 20 hours, the pressure was increased to 90 bar g and the gas and liquid flows were adjusted to increase the total gas hourly velocity to 2250 Nl/kg/h while maintaining the same oxygen/$H_2S$ ratio and increase the ratio of gas/liquid flow rates.

After another 20 hours, the gas and liquid flows were adjusted to operate at an oxygen/$H_2S$ ratio of 1.22 and a total gas hourly velocity of 1590 Nl/kg/h.

Samples of the gaseous effluent were taken before each change in pressure or flow rates and at the end of the experiment. The samples were analyzed using online gas chromatography (equipped with a pulsed discharge detector). The $H_2S$ conversion was calculated. The results are shown in Table 1.

ment, all analysis indicated the presence of H2S in the effluent gas. The mercaptan conversion was calculated. The results are shown in Table 2.

Example 6

Mercaptan Removal in the Presence of $H_2S$ (According to the Invention)

A precipitated iron oxide on silica powder with a nominal composition of 50% wt $Fe_2O_3$ and 50% wt $SiO_2$, a particle size D[v,50] of 10 micron and a BET surface area of 270 $m^2$/g, was obtained from Euro Support B.V. (Amersfoort, NL). The powder was treated in air at 450° C. for 2 hours, cooled down to room temperature.

A 2 cm cross section bubble column, height 25 cm reactor is mounted into an oven and equipped with a glass frid to support the catalyst, a gas manifold to supply metered amounts of a gas via two separate tubes below the glass frid, a back-pressure regulator, a wet gas test meter and an on-line

TABLE 1

Process conditions and results of examples 2 to 4.

| example | | feed gas | $O_2$/$H_2S$ ratio | inert liquid medium | gas/liquid flow (Nl/kg) | p (bar g) | $H_2S$ conversion (%) | $CH_4$ conversion (%) |
|---|---|---|---|---|---|---|---|---|
| 2 | a | 15 vol % $H_2S$ in $CH_4$ | 0.5 | toluene | 300 | 30 | 98.2 | 0.02 |
| | b | 15 vol % $H_2S$ in $CH_4$ | 0.5 | (continuous | 300 | 15 | 88 | <0.02 |
| | c | 7 vol % $H_2S$ in $CH_4$ | 0.5 | supply | 300 | 90 | 99.8 | 0.01 |
| | d | 15 vol % $H_2S$ in $H_2$ | 0.5 | without recycle) | 300 | 30 | 71 | n.a. |
| 3 | a | 7 vol % $H_2S$ in $CH_4$ | 0.82 | sulphur | n.a. | 40 | >99.9 | <0.01 |
| | b | 7 vol % $H_2S$ in $CH_4$ | 0.57 | (batch) | n.a. | 40 | 85 | <0.01 |
| | c | 7 vol % $H_2S$ in $CH_4$ | 0.98 | | n.a. | 40 | 98.2 | <0.01 |
| 4 | a | 7 vol % $H_2S$ in $CH_4$ | 0.56 | sulphur | 100 | 60 | 21 | |
| | b | 7 vol % $H_2S$ in $CH_4$ | 0.55 | (continuous | 200 | 90 | 60 | |
| | c | 7 vol % $H_2S$ in $CH_4$ | 1.22 | supply with recycle) | 100 | 90 | 99.7 | | n.a.: not applicable

Example 5

Mercaptan Removal (Comparative Example)

A 250 ml autoclave reactor equipped with a magnetically coupled stirrer, a gas manifold to supply metered amounts of a gas via two separate dip tubes, a back-pressure regulator, a wet gas test meter and an on-line gas chromatograph was used for the mercaptan capture oxidation experiment. No catalyst was added. The autoclave was heated to 135° C. After 2 hours, the stirrer was started at 800 rpm. The vessel was pressurized to 30 or 40 barg using a gas stream of methane which was fed via the dip tube below the liquid level. When the pressure level was reached, the feed gas flow was switched and adjusted to the desired flow rate (see table 2).

Samples of the gaseous effluent were taken before each change in feed gas flow and at the end of the experiment. The samples were analyzed using online gas chromatography (equipped with a pulsed discharge detector). In this experigas chromatograph was used for the selective oxidation experiment. The column was filled with 60 grams of solid sulphur and 3.0 grams of catalyst. The bubble column was pressurized with nitrogen up to 17 barg and heated to 139° C. When the pressure level and temperature was reached, the feed gas flow was switched to the mixture indicated in Table 2 at a total flow rate of 6 Nl/hr corresponding to a gas hourly space velocity of 2000 Nl/kg catalyst/hour. Samples of the gaseous effluent (the $H_2S$ depleted gas stream) were taken during the experiment. The samples were analyzed using online gas chromatography (equipped with a pulsed discharge detector). The $H_2S$ and the mercaptan conversion were calculated. The result is shown in Table 2. The results show that in the event that the feed gas stream comprises mercaptans, these are removed more effectively in the presence of a catalyst and molecular oxygen, resulting in a $H_2S$ depleted gas stream having lower levels of mercaptans.

TABLE 2

Process conditions and results of examples 5 and 6.

| example | | feed gas | O$_2$/H$_2$S ratio | gas flow (Nl/hr) | p (barg) | H$_2$S conversion (%) | mercaptan conversion (%) |
|---|---|---|---|---|---|---|---|
| 6 | | 0.5 vol % H$_2$S, 0.0321 vol % CH3SH, 0.0336 vol % C4H9SH, 1.23 vol % O2, 25 vol % N2, 33.3 vol % CH4, 4.8 vol % nC5H12 and balance He | 2.46 | 6 | 17 | 99.9 | >99 for C4H9SH >99 for CH3SH |
| 5 | a | 0.06 vol % CH$_3$SH in CH$_4$ | | 9.9 | 40 | | 83 for CH$_3$SH |
| | b | 0.046 vol % CH$_3$SH in CH$_4$ | | 5.2 | 40 | | 88 for CH$_3$SH |
| | c | 0.014 vol % CH$_3$SH + 0.014 vol % C$_4$H$_9$SH in CH$_4$ | | 16.8 | 30 | | 48 for CH$_3$SH; >97 for C$_4$H$_9$SH |

What is claimed is:

1. A process, comprising:
supplying a feed gas stream, wherein said feed gas stream comprises a feed gas H2S concentration of H2S in the range of from 0.5 to 50 vol %, an inert liquid medium, and molecular oxygen in an amount so as to provide a molar ratio of oxygen-to-H$_2$S in the range of from 0.3 to 3.0, to a reaction zone containing an oxidation catalyst comprising an oxide compound or a sulfide compound, or both, of one or more metals having the approximate general formula of MS$_{x-1}$O$_y$, wherein M is a metal selected from the group consisting of vanadium, chromium, manganese, iron, cobalt, molybdenum, or a combination thereof, and wherein S is sulfur, and wherein x and y have, independently, a numeric value of at least 1, wherein said reaction zone is operated under reaction conditions including a gaseous hourly space velocity in the range of from 100 to 10,000 Nl/kg/hr; a temperature in the range of from 120° C. to 160° C.; and a pressure in the range of from 2 to 200 bara so as to form elemental sulfur;
yielding from said reaction zone an effluent comprising said gas stream depleted of H$_2$S, elemental sulfur, and said inert liquid medium;
separating said effluent into a liquid stream and a gas stream depleted of H$_2$S;
separating said liquid stream into a first liquid phase enriched in said inert liquid medium and a second liquid phase enriched in elemental sulphur; and
combusting at least part of said second liquid phase to form a fluid stream comprising sulfur dioxide.

2. A process as recited in claim 1, wherein said gas stream depleted of H$_2$S has an H$_2$S concentration that is less than said feed gas H$_2$S concentration.

3. A process as recited in claim 2, further comprising: recycling said first liquid phase to said reaction zone.

4. A process as recited in claim 3, wherein said inert liquid medium is selected from the group consisting of water, liquid sulfur, the paraffins of n-pentane, n-hexane, n-heptane, n-octane and mixtures thereof, refinery hydrocarbon streams, naphtha, kerosene, crude oil, toluene, alkanol amines and sulfinol.

5. A process according to claim 4, wherein said inert liquid medium comprises liquid elemental sulfur.

6. A process according to claim 5, wherein said gas stream depleted of H2S has an H$_2$S concentration of less than 0.5 vol %.

7. A process as recited in claim 6, wherein the M of the general formula of the oxide compound of said oxidation catalyst is iron.

8. A process as recited in claim 7, further comprising: injecting said fluid stream into an acid gas field.

9. A process as recited in claim 8, wherein said feed gas stream further comprises a concentration of mercaptans in the range of from 1 ppmv to 1 vol %, based on the total feed gas stream.

10. A process as recited in claim 1, wherein said gas stream depleted of H$_2$S has an H$_2$S concentration that is less than said feed gas H$_2$S concentration.

11. A process as recited in claim 10, wherein said inert liquid medium is selected from the group consisting of water, liquid sulfur, the paraffins of n-pentane, n-hexane, n-heptane, n-octane and mixtures thereof, refinery hydrocarbon streams, naphtha, kerosene, crude oil, toluene, alkanol amines and sulfinol.

12. A process according to claim 11, wherein said inert liquid medium comprises liquid elemental sulfur.

13. A process according to claim 12, wherein said gas stream depleted of H$_2$S has an H$_2$S concentration of less than 0.5 vol %.

14. A process as recited in claim 13, further comprising: separating said liquid stream into a first liquid phase enriched in said inert liquid medium and a second liquid phase enriched in elemental sulfur.

15. A process as recited in claim 14, further comprising: recycling said first liquid phase to said reaction zone.

16. A process as recited in claim 15, wherein the M of the general formula of the oxide compound of said oxidation catalyst is iron.

17. A process as recited in claim 16, wherein said feed gas stream further comprises a concentration of mercaptans in the range of from 1 ppmv to 1 vol %, based on the total feed gas stream.

* * * * *